(12) United States Patent
White

(10) Patent No.: US 12,205,156 B2
(45) Date of Patent: Jan. 21, 2025

(54) SECURITY VIDEO SHARING VIA A SEARCHABLE DATABASE

(71) Applicant: BackTrack Video, Inc., West Bend, WI (US)

(72) Inventor: Lance White, West Bend, WI (US)

(73) Assignee: BackTrack Video, Inc., West Bend, WI (US)

( * ) Notice: Subject to any disclaimer, the term of this patent is extended or adjusted under 35 U.S.C. 154(b) by 416 days.

(21) Appl. No.: 17/707,209

(22) Filed: Mar. 29, 2022

(65) Prior Publication Data

US 2022/0222719 A1 Jul. 14, 2022

Related U.S. Application Data

(63) Continuation-in-part of application No. 16/744,802, filed on Jan. 16, 2020, now Pat. No. 11,315,154.

(60) Provisional application No. 62/906,383, filed on Sep. 26, 2019, provisional application No. 62/795,100, filed on Jan. 22, 2019.

(51) Int. Cl.
| | |
|---|---|
| *G06Q 30/00* | (2023.01) |
| *G06Q 20/12* | (2012.01) |
| *G06Q 30/0601* | (2023.01) |
| *H04N 7/18* | (2006.01) |
| *H04N 13/275* | (2018.01) |

(52) U.S. Cl.
CPC ....... *G06Q 30/0609* (2013.01); *G06Q 20/123* (2013.01); *G06Q 30/0625* (2013.01); *H04N 7/181* (2013.01); *H04N 13/275* (2018.05)

(58) Field of Classification Search
None
See application file for complete search history.

(56) References Cited

U.S. PATENT DOCUMENTS

| | | |
|---|---|---|
| 5,495,576 A | 2/1996 | Ritchey |
| 9,041,812 B2 | 5/2015 | Billau et al. |
| 9,124,802 B2 | 9/2015 | Steuart, III |
| 11,095,871 B2 | 8/2021 | Kawahara |

(Continued)

OTHER PUBLICATIONS

Authorized Officer: Shane Thomas, International Search Report and Written Opinion issued in counterpart PCT application No. PCT/US2020/013891, Apr. 1, 2020, 7 pp.

(Continued)

*Primary Examiner* — Mila Airapetian
(74) *Attorney, Agent, or Firm* — Kaplan Breyer Schwarz, LLP

(57) ABSTRACT

A method for sharing surveillance video and receiving payment therefor utilizing a video sharing operator/manager is provided including providing access to video segments created by virtual viewpoint video surveillance camera systems tagged with capture information, providing a connection from each of the camera systems to the video sharing operator/manager and registering sellers of video. The method continues with receiving uploaded capture information on a searchable database from the camera systems and registering buyers. The method continues with receiving a search request from a buyer based on a specific set of capture information and receiving an uploaded requested video segment in response to the search request. The seller receives payment for the video segment from the buyer and, the video segment is downloaded to the buyer.

10 Claims, 4 Drawing Sheets

(56) References Cited

U.S. PATENT DOCUMENTS

| | | |
|---|---|---|
| 11,315,154 B2 | 4/2022 | White |
| 2002/0158873 A1 | 10/2002 | Williamson |
| 2007/0088817 A1 | 4/2007 | Li |
| 2008/0303903 A1 | 12/2008 | Bentley et al. |
| 2011/0058034 A1* | 3/2011 | Grass ............... G08B 13/19656 348/143 |
| 2011/0099083 A1 | 4/2011 | Karpinsky |
| 2012/0105632 A1* | 5/2012 | Renkis ............... G08B 13/1966 348/143 |
| 2015/0145991 A1* | 5/2015 | Russell ............... G06Q 10/103 348/143 |
| 2016/0134932 A1 | 5/2016 | Karp et al. |

OTHER PUBLICATIONS

Notice of Allowance and Fees Due (PTOL-85) Mailed on Jan. 5, 2022 for U.S. Appl. No. 16/744,802.

\* cited by examiner

SECURITY VIDEO SHARING VIA A SEARCHABLE DATABASE

CROSS REFERENCES TO RELATED APPLICATIONS

This application claims priority to U.S. patent application Ser. No. 16/744,802, entitled Security Video Sharing via a Searchable Database, filed Jan. 16, 2020, pending, which claims priority to U.S. Provisional Patent Application No. 62/795,100 filed Jan. 22, 2019, entitled Security Camera Video Database and U.S. Provisional Patent Application No. 62/906,383, filed Sep. 26, 2019, entitled Security Video Sharing via a Searchable Database.

FIELD OF THE INVENTION

The present invention is directed to surveillance systems. More particularly, the present invention is directed to sharing of video surveillance data between owners of video and persons desiring video from a specific location at a designated time and date.

BACKGROUND OF THE INVENTION

Video surveillance systems have been widely used for many years, providing security to homes, businesses and public areas. Video cameras have been used in a number of different surveillance applications to monitor locations instead of having an actual person physically present. While much video is examined live by owners, occupants and security personnel, video signals are often stored for later viewing.

Digital imaging and digital networking have supplanted earlier analog video designs and reduced the cost of processing video information. It is now possible to capture video images using inexpensive digital video cameras and to transmit video via the internet or other networks, to display video on mass-produced consumer devices such as desktop personal computers, laptops, notebook computers, smart phones, and other portable digital devices. Large amounts of video may be stored on relatively inexpensive mass storage devices. The relatively low cost of modern digital surveillance technology, particularly small, off-the-shelf surveillance systems intended for homeowners and small businesses, has greatly increased the number of such surveillance systems in use.

The widespread availability of broadband connections to the internet has enabled video surveillance cameras to be accessed remotely. Video can be recorded locally or at an off-site location through the use of an internet connection. If stored off-site, the recorded video signals can be accessed at a future time through an internet connection.

While private businesses and individuals may be reluctant to allow unrestricted surveillance of their property by others, there are circumstances in which they may not only be willing, but desirous, of such surveillance, particularly if it benefits them in some way.

A need exists for improved methods and systems for managing and accessing surveillance video, and particularly for conditionally accessing, by others, surveillance video under the control of a business, property owner, tenant, or the like.

The advent of digital cameras of increasing resolution and photo quality, along with constantly increasing speed and processing power of computers, has laid the foundation for 3-dimensional digital camera systems capable of capturing image data for the creation of 3-dimensional images and movies 3-dimensional photography has been available for over one hundred years through stereoscopic cameras. In a stereoscopic camera system, two cameras are used to capture a scene, each from a slightly different vantage point. The camera configuration is typically similar to the human eyes; with two cameras side-by-side and capturing two separate, but largely overlapping, views. The two images are viewed together through a stereoscopic viewer, giving the visual perception of three dimensions where the images overlap.

Virtual Reality (VR) is an artificial environment constructed by a computer that permits the user to interact with that environment as if the user were actually immersed in the environment. VR devices permit the user to see three-dimensional (3D) depictions of an artificial environment and to move within that environment. VR broadly includes Augmented Reality (AR) technology, which allows a person to see or otherwise sense a computer-generated virtual world integrated with the real world. The "real world" is the environment that an observer can see, feel, hear, taste, or smell using the observer's own senses. The "virtual world" is defined as a generated environment stored in a storage medium or calculated using a processor. Typically, these systems utilize a head-mounted display.

Virtual viewpoint systems are well known. For example, U.S. Patent Pub. No. 2002/0158873 (Williamson) is directed to a virtual viewpoint system and underlying structure and architecture in which the system is capable of capturing and saving information where a virtual environment is created. The underlying concept is that a number of cameras are arrayed around an object to be captured. The object may be viewed from an arbitrary viewpoint (where a camera may not have been in the real world). The system uses this three-dimensional information and the images that it does have to produce a simulated picture (or video) of what the object would look like from the viewpoint. The virtual viewpoint system essentially comprises spatially arranged digital video cameras that can capture video and use three-dimensional modeling to compute virtual views for the viewer. These views are incorporated into virtual space.

U.S. Pat. No. 11,095,871 (Kawahara) discloses a virtual viewpoint system that generates a virtual viewpoint image from multiple viewpoint images captured from different camera viewpoints and uses background 3D data representing a three-dimensional shape of a background in an image capturing scene. This background 3D data is generated by using a simulation image representing a view from the camera viewpoint.

All references cited herein are incorporated herein by reference in their entireties.

SUMMARY OF THE INVENTION

In a first embodiment of the present invention, a method for sharing surveillance video and receiving payment therefor utilizing a video sharing operator/manager is provided. The method first includes the step of providing access by the video sharing operator/manager to video segments created by video surveillance camera systems. Each camera system is adapted to capture and store at least one of the video segments, and each video segment is tagged with capture information having at least a date, a time and a duration of the video and a geo-location of a camera system that captured the video segment. The method continues with the step of providing a connection from each of the video surveillance camera systems, via an internet compatible device and via a global computer network, to the video sharing operator/manager. Next, sellers register on the video sharing operator/manager, where the sellers each control at least one of the plurality of video surveillance camera systems on the video sharing operator/manager. Uploaded and stored tagged capture information is received on a database of the video sharing operator/manager from the camera systems. The database is searchable by the tagged capture information. Buyers register on the video sharing operator/manager where each buyer is given access to the video sharing operator/manager to request at least one video based on the uploaded and tagged capture information. Search requests are received by the video sharing operator/manager from one of the buyers based on a specific set of capture information. An uploaded video segment is received that is tagged with the specific set of capture information by the video sharing operator/manager from the seller in response to the search request. The video sharing system receives payment from the buyer for the uploaded requested video segment. Finally, the requested video segment is downloaded to the buyer.

The capture information may include at least one of direction, height, resolution, color information, night vision information, and type of camera.

In an alternate exemplary embodiment of the present invention, a method for sharing surveillance video and receiving payment therefor utilizing a video sharing operator/manager is provided. The method begins with providing access by the video sharing operator/manager to video segments created by video surveillance camera systems, where each camera system is capable of capturing and storing at least one of the video segments. Each video segment is tagged with capture information having at least a date, a time and a duration of the video and a geo-location of a camera system that captured the video segment. Next, a connection from each of the plurality of video surveillance camera systems is provided, via an internet compatible device and via a global computer network, to the video sharing operator/manager. Sellers are registered on the video sharing operator/manager, where the sellers each control at least one of the video surveillance camera systems on the video sharing operator/manager. Uploaded and stored tagged capture information is received on a database of the video sharing operator/manager from the camera systems, wherein the database is searchable by the tagged capture information. Buyers are registered on the video sharing operator/manager, giving each buyer access to the video sharing operator/manager to request one or more videos from sellers based on the uploaded and tagged capture information. Payment for a designated flat-rate price from each of the buyers is provided for access to a designated quantity of video segments. At least one search request is received by the video sharing operator/manager from one of the buyers based on a specific set of capture information. An uploaded requested video segment is received that is tagged with the specific set of capture information by the video sharing operator/manager from the seller in response to the search request. Finally, the uploaded requested video segment is downloaded to the buyer.

The flat-rate price allows the buyer to receive an unlimited number of requested videos.

In another alternate exemplary embodiment of the present invention, a method for sharing surveillance video and receiving payment therefor utilizing a video sharing operator/manager is provided. First, a plurality of video surveillance camera systems is provided where each camera system is adapted to capture and store video. Each video is tagged with capture information including at least a date, a time, a duration and a geo-location of the camera system. A connection from each of the video surveillance camera systems is provided, via an internet compatible device and via a global computer network, to the video sharing operator/manager. Sellers are registered on the video sharing operator/manager where sellers each control at least one of the video surveillance camera systems on the video sharing operator/manager. Buyers are registered on the video sharing operator/manager, where each buyer has access to the video sharing operator manager to request one or more videos from sellers. Surveillance video is recorded by at least one of the video surveillance camera systems by the sellers and the video with the capture information is tagged. The tagged capture information is uploaded and stored on a database of the video sharing operator/manager, wherein the database is searchable by the tagged capture information by the buyers. The method continues with the steps of searching for and requesting video in the database based on a specific set of capture information by the buyer and uploading video by the seller in response to the requested video from the buyer. Finally, the uploaded video is purchased and downloaded by the buyer.

The capture information may include at least one of direction, height, resolution, color information, night vision information, and type of camera. The buyer may subscribe to a purchase plan for a limited time for a designated price, wherein the buyer purchases a plurality of videos during a particular time period for a flat rate.

In another alternate exemplary embodiment of the present invention, a method for sharing surveillance video and receiving payment therefor utilizing a video sharing operator/manager is provided, including the first step of providing access by the video sharing operator/manager to a plurality of video segments created by a plurality of virtual viewpoint video surveillance camera systems. Each virtual viewpoint camera system is disposed at a location and adapted to capture and store at least one virtual reality video segment. The virtual reality video segment is obtained from a plurality of cameras aligned at the location to capture different views of the location. Each video segment is obtained by modeling a three-dimensional image of the location, and each video segment is tagged with capture information comprising at least a date, a time and a duration of the video and a geo-location of a camera system that captured the video segment. The virtual reality video segment is adapted to be used in a simulated reality environment in accordance with a viewer's perspective. The method continues with the steps of providing a connection from each of the plurality of video surveillance camera systems, via an internet compatible device and via a global computer network, to the video sharing operator/manager; registering a plurality of sellers on the video sharing operator/manager, the sellers each controlling at least one of the plurality of video surveillance camera systems on the video sharing operator/manager; and receiving uploaded and stored tagged capture information on a database of the video sharing operator/manager from the plurality of camera systems, wherein the database is searchable by the tagged capture information. The method further continues with the steps of registering a plurality of buyers on the video sharing operator/manager, the video sharing operator/manager giving each buyer access to the video sharing operator/manager to request at least one video based on the uploaded and tagged capture information; receiving at least one search request by the video sharing operator/manager from one of the plurality of buyers based on a specific set of capture information; receiving an uploaded requested video segment that is tagged with the specific set of capture information by the video sharing operator/manager from the seller in response to the search request; receiving payment for the uploaded requested video segment from the buyer; and downloading the uploaded requested video segment to the buyer. The capture information may further comprise at least one of direction, height, resolution, color information, night vision information, and type of camera. The requested video segment may be authenticated by a nonfungible token to provide a public certificate of authenticity.

In another exemplary embodiment of the present invention, a method for sharing surveillance video and receiving payment therefor utilizing a video sharing operator/manager is provided. The method first includes the steps of providing access by the video sharing operator/manager to a plurality of video segments created by a plurality of virtual viewpoint video surveillance camera systems, each virtual viewpoint camera system disposed at a location and adapted to capture and store at least one virtual reality video segment, the virtual reality video segment obtained from a plurality of cameras aligned at the location to capture different views of the location, each video segment obtained by modeling a three-dimensional image of the location, each video segment tagged with capture information comprising at least a date, a time and a duration of the video and a geo-location of a camera system that captured the video segment. The virtual reality video segment is adapted to be used in a simulated reality environment in accordance with a viewer's perspective. The method continues with the steps of providing a connection from each of the plurality of video surveillance camera systems, via an internet compatible device and via a global computer network, to the video sharing operator/manager; registering a plurality of sellers on the video sharing operator/manager, the sellers each controlling at least one of the plurality of video surveillance camera systems on the video sharing operator/manager; receiving uploaded and stored tagged capture information on a database of the video sharing operator/manager from the plurality of camera systems, wherein the database is searchable by the tagged capture information; and registering a plurality of buyers on the video sharing operator/manager, the video sharing operator/manager giving each buyer access to the video sharing operator/manager to request one or more videos from sellers based on the uploaded and tagged capture information. The method continues with the steps of receiving payment for a designated flat-rate price from each of the plurality of buyers for access to a designated quantity of video segments; receiving at least one search request by the video sharing operator/manager from one of the plurality of buyers based on a specific set of capture information; receiving an uploaded requested video segment that is tagged with the specific set of capture information by the video sharing operator/manager from the seller in response to the search request; and downloading the uploaded requested video segment to the buyer. The flat-rate price allows the buyer to receive an unlimited number of requested videos. The requested video segment may be authenticated by a nonfungible token to provide a public certificate of authenticity.

Finally, a method for sharing surveillance video and receiving payment therefor utilizing a video sharing operator/manager is provided in accordance with another exemplary embodiment of the present invention. The method first includes the step of providing a plurality of virtual viewpoint video surveillance camera systems, each virtual viewpoint camera system disposed at a location and adapted to capture and store at least one virtual viewpoint video segment, each video segment obtained from a plurality of cameras aligned at the location to capture different views of the location, each video segment obtained by modeling a three-dimensional image of the location, each virtual viewpoint segment tagged with capture information comprising at least a date, a time, a duration and a geo-location of the camera system at the location that captured the video segment, wherein the virtual reality video segment is adapted to be used in a simulated reality environment in accordance with a viewer's perspective. The method continues with the steps of providing a connection from each of the plurality of video surveillance camera systems, via an internet compatible device and via a global computer network, to the video sharing operator/manager; registering a plurality of sellers on the video sharing operator/manager, the sellers each controlling at least one of the plurality of video surveillance camera systems on the video sharing operator/manager; registering a plurality of buyers on the video sharing operator/manager, each buyer having access to the video sharing operator manager to request one or more videos from sellers; and recording surveillance video by at least one of the video surveillance camera systems by the sellers and tagging the video with the capture information. Finally, the method continues with the steps of uploading and storing the tagged capture information on a database of the video sharing operator/manager, wherein the database is searchable by the tagged capture information by the buyers; searching for and requesting video in the database based on a specific set of capture information by the buyer; uploading video by the seller in response to the requested video from the buyer; and purchasing and downloading of the uploaded video by the buyer. The pluralities capture information may further comprise at least one of direction, height, resolution, color information, night vision information, and type of camera. The method may further include the step of the buyer subscribing to a purchase plan for a limited time for a designated price, wherein the buyer purchases a plurality of videos during a particular time period for a flat rate. The requested video segment may be authenticated by a nonfungible token to provide a public certificate of authenticity.

DETAILED DESCRIPTION

Figure 1:
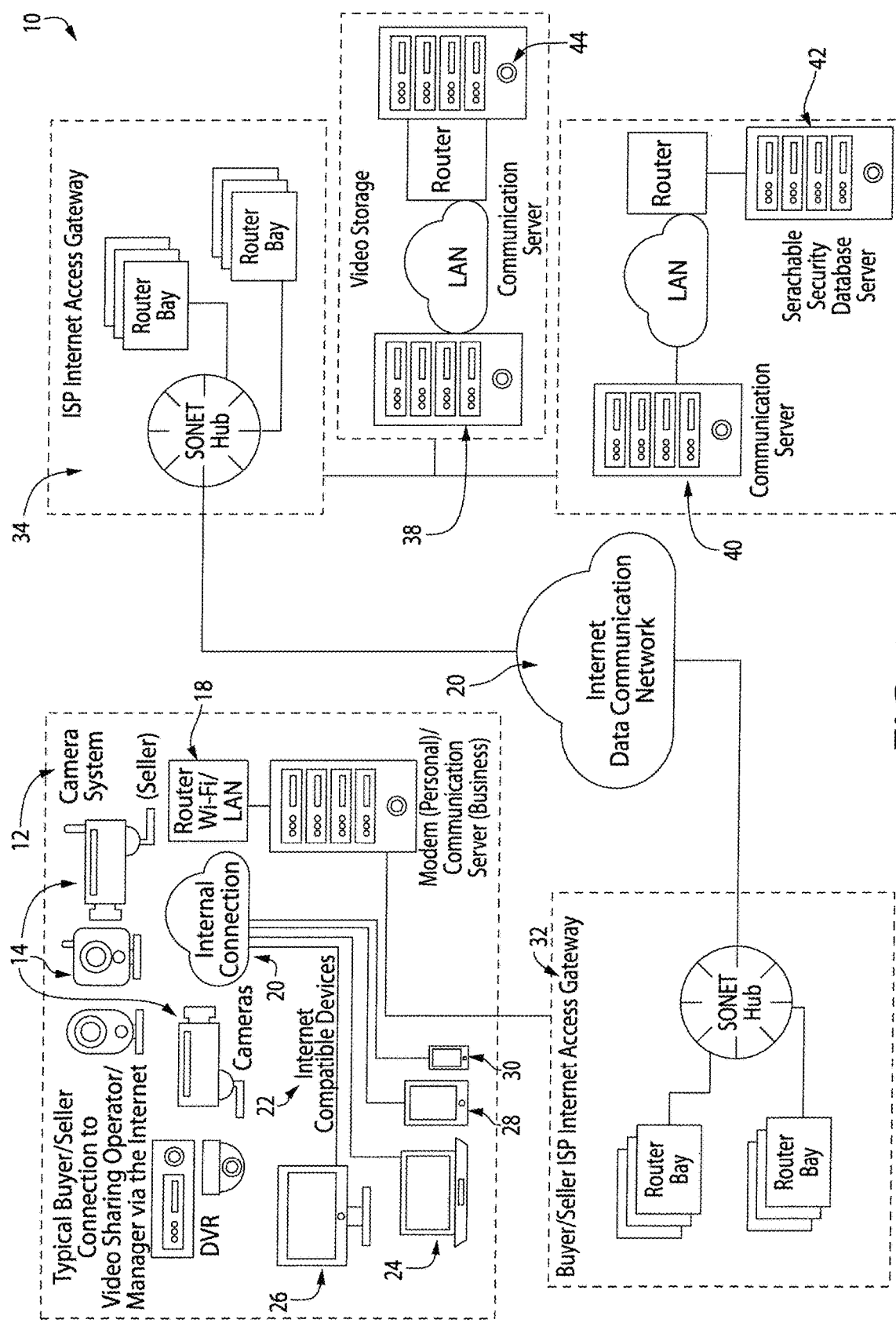
FIG. 1 depicts a schematic system diagram of the hardware of the method of sharing surveillance video collected by a plurality of independent users in accordance with an exemplary embodiment of the present invention.

Referring now to the drawing figures, wherein like part numbers refer to like elements throughout the several views, there is shown in FIG. 1 a schematic system diagram of exemplary hardware system 10 for use with the method of sharing surveillance video collected by a plurality of independent users in accordance with an exemplary embodiment of the present invention. The hardware system 10 includes several basic subgroups:

First, local camera systems 12 are provided. The local camera systems 12 include, for example, video cameras 14, digital video recorders (DVRs) 16, drone cameras, an internet (e.g., Wi-Fi) connection 18 (optionally connected via a local area network) that is connected to a global computer network (e.g., the internet) 20, and one or more internet compatible devices 22 (e.g., laptops 24, desktops 26, tablets 28, mobile phones 30, etc.).

Figure 3:
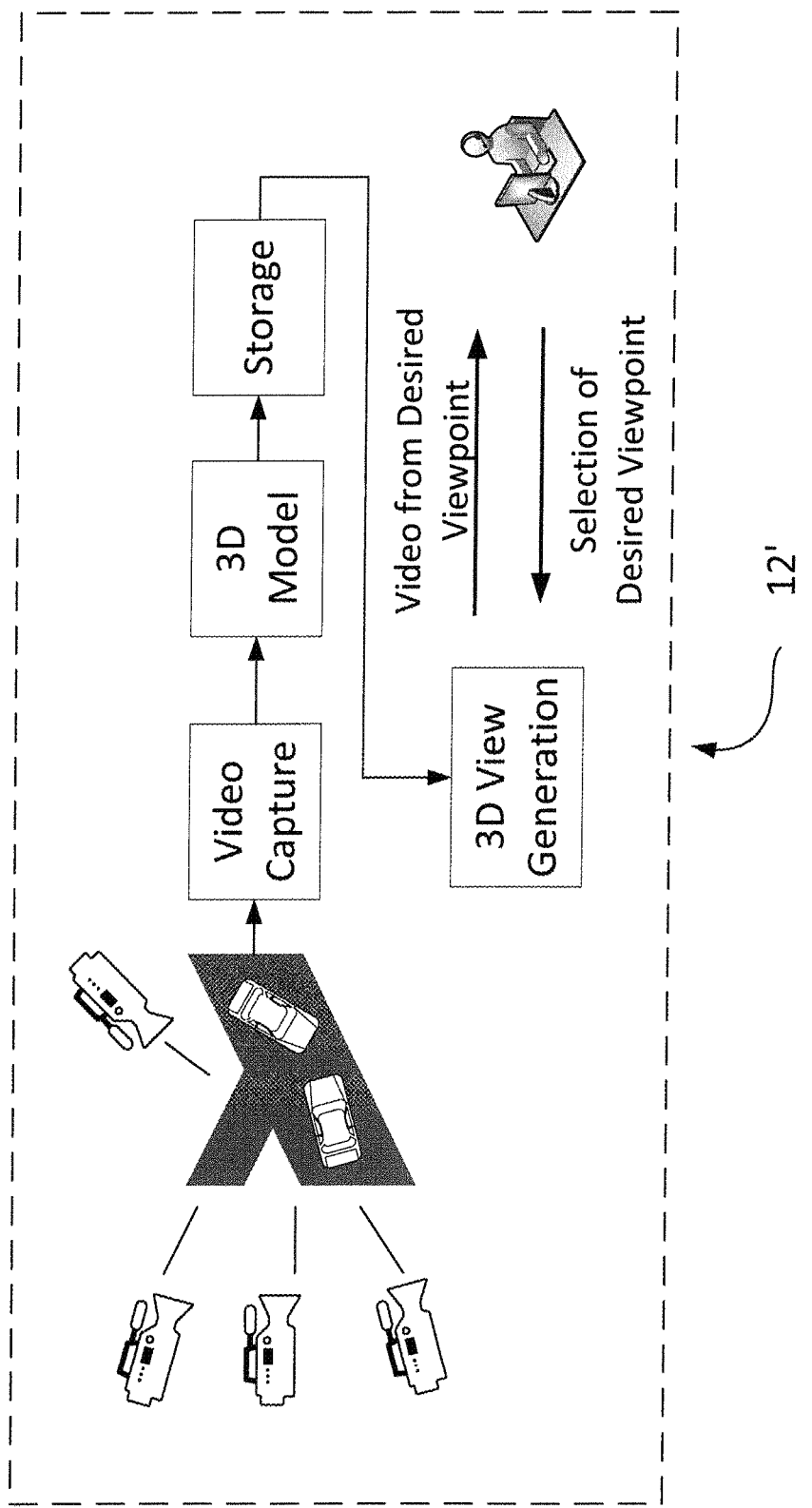
FIG. 3 depicts a virtual viewpoint camera system of the schematic system diagram of the hardware of the method of claim 1 for use in obtaining a simulated reality environment in accordance with a viewer's perspective.

As can be seen in FIG. 3, the local camera system 12 of FIG. 1 may be a virtual viewpoint camera system 12' where each virtual viewpoint camera system 12' is disposed at a location and adapted to capture and store at least one virtual reality video segment by use of a plurality of video cameras 14' that are aligned at the location to capture different views of the location. Each virtual viewpoint video segment is obtained by modeling a three-dimensional image of the location. Each virtual viewpoint video segment is tagged with capture information comprising at least a date, a time and a duration of the video and a geo-location of a camera system (FIG. 3) that captured the virtual viewpoint video segment. The virtual reality video segment is a simulated reality environment in accordance with a viewer's perspective in accordance with systems well known in the art.

Next, the camera systems 12 may be connected via the internet connection 18 to a buyer/seller internet access gateway 32 (connected via an internet service provider to the global computer network 20).

A video sharing operator/manager (i.e., a computer software application and associated hardware that includes gateways 32, 34 accessible by buyers and sellers of video as described herein; the associated hardware may include, for example, communications servers 38, 40, database servers 42, routers, searchable video storage 44, etc.) manages and monetizes the sales of video from sellers to buyers. When uploaded by sellers (described below), videos captured by the camera systems 12 are stored in the video storage 44 and controlled by the video sharing operator/manager.

Figure 2A:
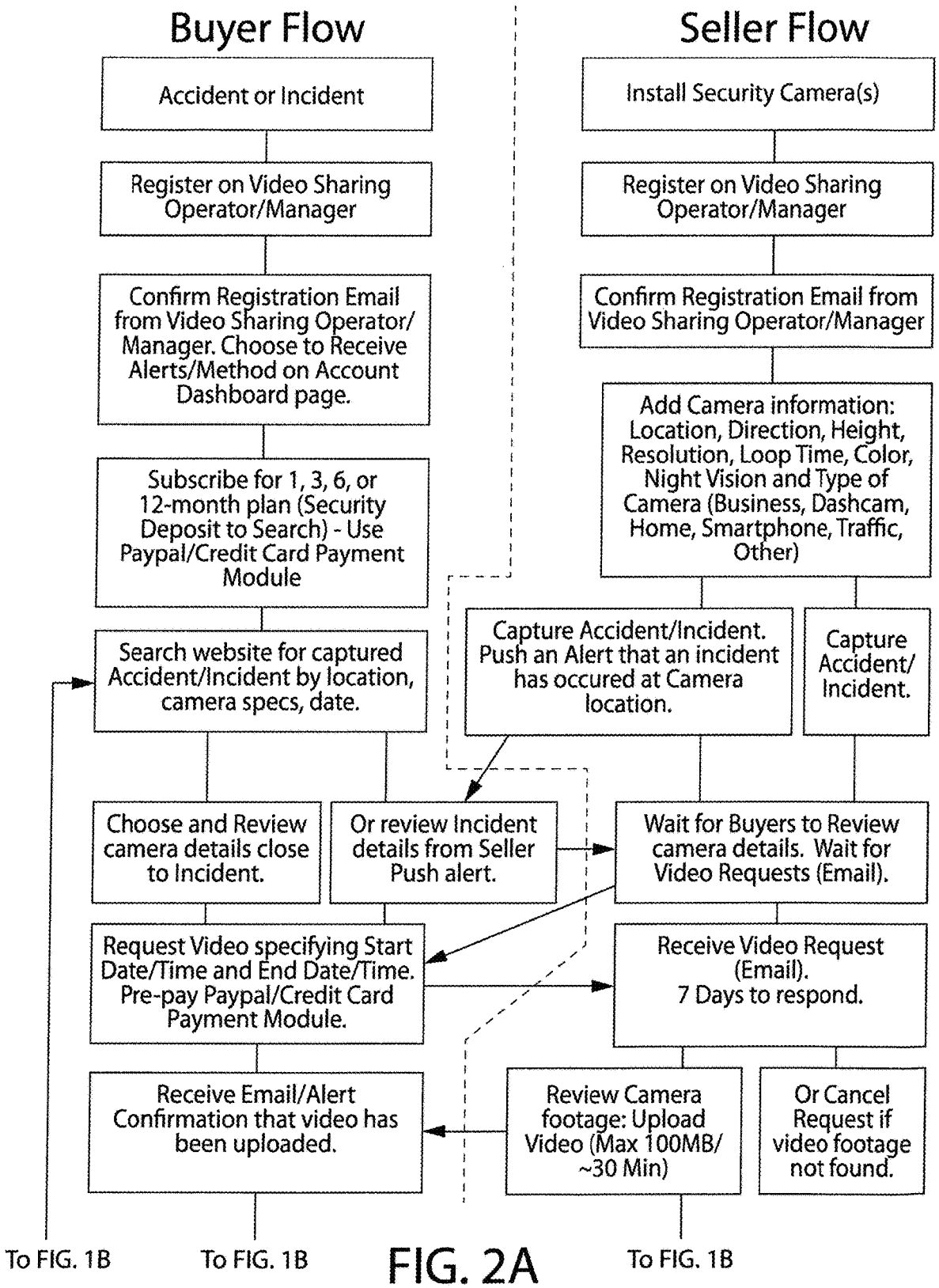
FIGS. 2A and 2B depict a flowchart of the method of sharing surveillance video collected by a plurality of independent using the system of FIG. 1.
Figure 2B:
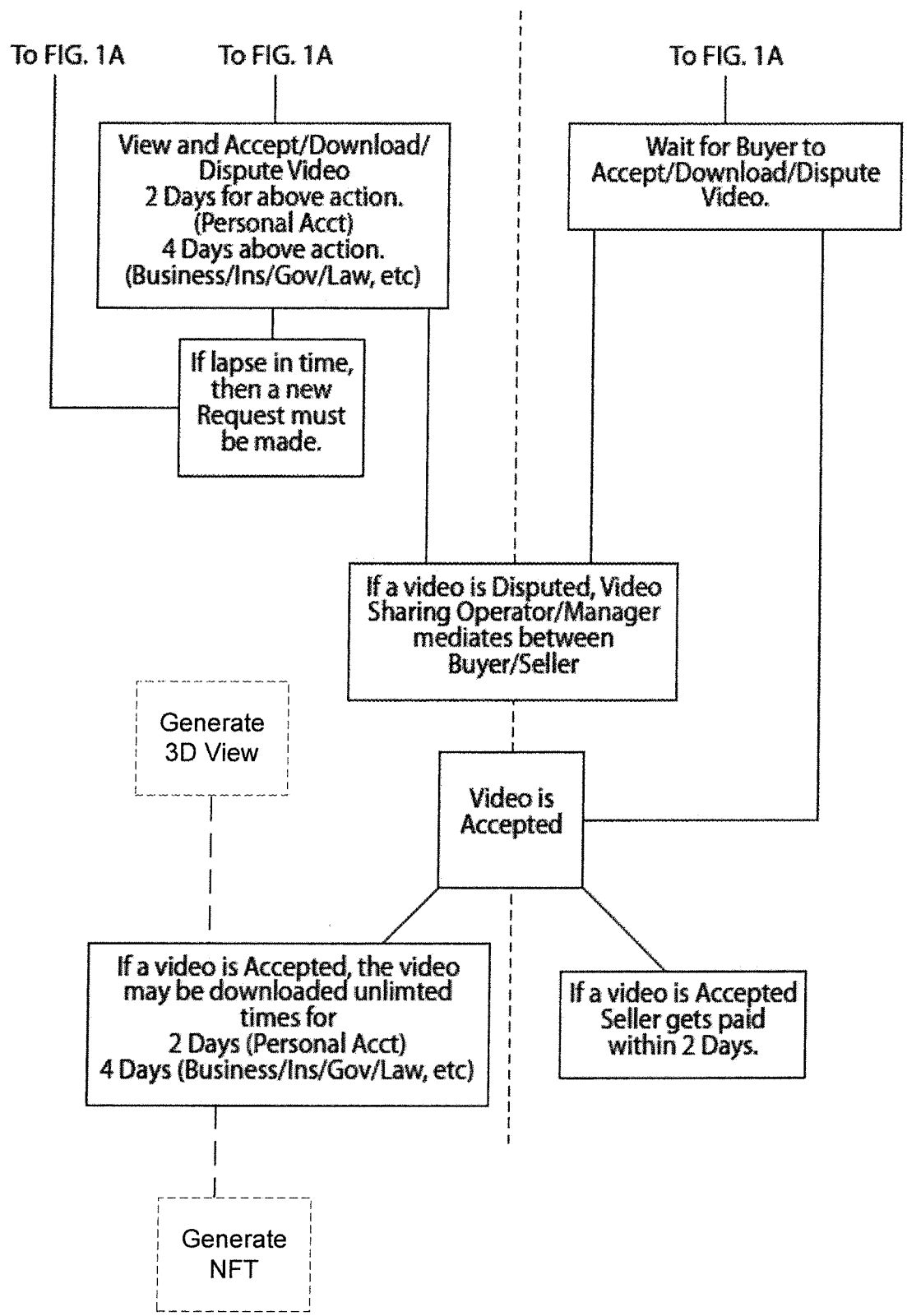

FIGS. 2A and 2B, depict a flowchart of a method of sharing surveillance video segments collected by sellers and purchased by buyers who desire one or more specific videos from a particular location at a particular time and date. As noted, there are two primary types of users of the system: (1) buyers of video segments and (2) sellers of video segments. Each will be discussed separately below.

Sellers:

On the "seller" side of FIGS. 2A and 2B, each owner (i.e., the seller of video segments) of one or more installed video cameras systems 12 registers, via an internet compatible device 20, with the video sharing operator/manager 28. There may be thousands or more sellers utilizing the system, each having one or more camera systems 12. Typical registration and security procedures may be used, including, for example, passwords, confirmation e-mails, etc., as are well known. The owners' camera systems capture and store incidents, accidents or any other video segments in which the buyers (discussed below) may have interest in purchasing. The seller then identifies and uploads capture information from the camera system to the video sharing operator/manager, which, at a minimum, includes date, time, duration and geo-location of video recorded on the camera system. Additional information such as direction, height, resolution, loop time, color data, night vision data, type of camera (e.g. business, dashcam, home, smartphone, traffic, drone, etc.) may also be included in the capture information. The seller may also specifically identify a particular accident or incident captured by the camera. The system may automatically identify such an accident or incident, based on, for example, movement of objects within a particular camera system's field of view. The seller's capture information is uploaded via an internet compatible device 22 to the video sharing operator/manager 36.

Once registered, capture information from each camera system may be periodically or continuously uploaded to the video sharing operator/manager. The seller then waits for buyers to review the capture information and waits for requests for specific video segments. Once a video request is received and reviewed by the seller, the seller uploads the video segment to the video sharing operator/manager for access and viewing by the buyer. The buyer reviews the uploaded video and accepts the video (or may dispute the video for a variety of reasons). If the video segment is accepted, the seller is paid a predetermined fee. If the video is disputed (for example, poor quality, excessively blurry, not what was offered, improper capture information from the seller), the video sharing operator/manager may mediate the dispute. The video may be downloaded by the seller. The period for downloading by the buyer may be limited to, for example, two or four days.

Buyers:

On the "buyer" side of FIGS. 2A and 2B, the buyer is interested in obtaining video of a particular accident or incident, and is aware that video cameras may be present at such accident or incident. The seller registers, via an internet compatible device 22, with the video sharing operator/manager in a similar manner to that of the seller. Optionally, the buyer may subscribe to, for example, a 1, 3,6 or 12-month plan for multiple or unlimited videos for a designated price. The buyer then uses the video sharing operator/manager application to search for information on a specific accident or information utilizing the capture information uploaded by sellers. Optionally, buyers may obtain pushed information from a seller such that the buyer is alerted when an incident or accident at a particular location occurs. The buyer purchases the specific video, via the video sharing operator/manager, using for example, an online payment system, such as with credit cards, debit cards, PayPal and the like. The buyer may have a set period of time to accept or dispute the video, for example, 2 or 4 days.

The video sharing operator/manager receives payment for the transaction based on a portion of the price the purchase price, and may be, for example, a percentage of the purchase price, a flat rate per video, etc.

It is anticipated that the system will include dashboard interfaces on internet compatible devices 22 for buyers and sellers with multiple locations or users. It is also anticipated that the system will incorporate artificial intelligence and/or deep learning algorithms to automate some of the capture/upload process for sellers.

An "alert" system will also be incorporated for sellers to send out, and buyers to receive, alerts regarding various aspects of the buying and selling of videos. A reward system in the form of goods, services, donations, etc. is also desired to be used with the present invention.

If the virtual viewpoint camera system of FIG. 3 is used, the actual 3D modelling can be accomplished at any logical point during the method (upon video segment capture, up video acceptance by a seller, or at any logical point in between).

Authentication:

The present invention may be particularly applicable where use of a requested video segment is desired for use as evidence in a courtroom or other legal setting. In such a setting, it would be highly desirable to authenticate the video segment as a public certificate of authenticity. One such way of providing such a certificate of authenticity is by use of nonfungible tokens (NFTs). An NFT is a unit of data stored on a digital ledger, called a blockchain. The NFT can be specifically associated with the video segment for the purpose of authentication. NFTs are created when blockchains string records of cryptographic hash, a set of characters identifying a set of data, onto previous records, therefore, creating a chain of identifiable data blocks. This cryptographic transaction process ensures the authentication of each digital file by providing a digital signature that is used to track NFT ownership. See FIG. 2B. The general use of NFT for general authentication of digital assets is known.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for sharing surveillance video and receiving payment therefor utilizing a video sharing operator/manager, comprising:
   (a) providing a plurality of virtual viewpoint video camera systems, each virtual viewpoint camera system disposed at a location and adapted to capture and store at least one virtual reality segment, said virtual reality video segment obtained from a plurality of cameras aligned at the location to capture different views of the location;
   (b) providing access by the video sharing operator/manager to a plurality of video segments created by the plurality of virtual viewpoint video surveillance camera systems, each video segment obtained by modeling a three-dimensional image of the location, each video segment tagged with capture information comprising at least a date, a time and a duration of the video and a geo-location of a camera system that captured the video segment, wherein the virtual reality video segment is adapted to be used in a simulated reality environment in accordance with a viewer's perspective;
   (c) providing a connection from each of the plurality of video surveillance camera systems, via an internet compatible device and via a global computer network, to the video sharing operator/manager;
   (d) registering a plurality of sellers on the video sharing operator/manager, the sellers each controlling at least one of the plurality of video surveillance camera systems on the video sharing operator/manager;
   (e) receiving uploaded and stored tagged capture information on a database of the video sharing operator/manager from the plurality of camera systems, wherein the database is searchable by the tagged capture information;
   (f) registering a plurality of buyers on the video sharing operator/manager, the video sharing operator/manager giving each buyer access to the video sharing operator/manager to request at least one video based on the uploaded and tagged capture information;
   (g) receiving at least one search request by the video sharing operator/manager from one of the plurality of buyers based on a specific set of capture information;
   (h) receiving an uploaded requested video segment that is tagged with the specific set of capture information by the video sharing operator/manager from the seller in response to the search request;
   (i) receiving payment for the uploaded requested video segment from the buyer; and
   (j) downloading the uploaded requested video segment to the buyer.

2. The method of claim 1, wherein the capture information further comprises at least one of direction, height, resolution, color information, night vision information, and type of camera.

3. The method of claim 1, wherein the requested video segment is authenticated by a nonfungible token to provide a public certificate of authenticity.

4. A method for sharing surveillance video and receiving payment therefor utilizing a video sharing operator/manager, comprising:
   (a) a plurality of virtual viewpoint video surveillance camera systems, each virtual viewpoint camera system disposed at a location and adapted to capture and store at least one virtual reality video segment, said virtual reality video segment obtained from a plurality of cameras aligned at the location to capture different views of the location,
   (b) providing access by the video sharing operator/manager to the plurality of video segments each video segment obtained by modeling a three-dimensional image of the location, each video segment tagged with capture information comprising at least a date, a time and a duration of the video and a geo-location of a camera system that captured the video segment, wherein the virtual reality video segment is adapted to be used in a simulated reality environment in accordance with a viewer's perspective;
   (c) providing a connection from each of the plurality of video surveillance camera systems, via an internet compatible device and via a global computer network, to the video sharing operator/manager;
   (d) registering a plurality of sellers on the video sharing operator/manager, the sellers each controlling at least one of the plurality of video surveillance camera systems on the video sharing operator/manager;
   (e) receiving uploaded and stored tagged capture information on a database of the video sharing operator/manager from the plurality of camera systems, wherein the database is searchable by the tagged capture information;
   (f) registering a plurality of buyers on the video sharing operator/manager, the video sharing operator/manager giving each buyer access to the video sharing operator/manager to request one or more videos from sellers based on the uploaded and tagged capture information;
   (g) receiving payment for a designated flat-rate price from each of the plurality of buyers for access to a designated quantity of video segments;
   (h) receiving at least one search request by the video sharing operator/manager from one of the plurality of buyers based on a specific set of capture information;
   (i) receiving an uploaded requested video segment that is tagged with the specific set of capture information by the video sharing operator/manager from the seller in response to the search request; and
   (j) downloading the uploaded requested video segment to the buyer.

5. The method of claim 4, wherein the flat-rate price allows the buyer to receive an unlimited number of requested videos.

6. The method of claim 4, wherein the requested video segment is authenticated by a nonfungible token to provide a public certificate of authenticity.

7. A method for sharing surveillance video and receiving payment therefor utilizing a video sharing operator/manager, comprising:
(a) providing a plurality of virtual viewpoint video surveillance camera systems, each virtual viewpoint camera system disposed at a location and adapted to capture and store at least one virtual viewpoint video segment, each video segment obtained from a plurality of cameras aligned at the location to capture different views of the location, each video segment obtained by modeling a three-dimensional image of the location, each virtual viewpoint segment tagged with capture information comprising at least a date, a time, a duration and a geo-location of the camera system at the location that captured the video segment, wherein the virtual reality video segment is adapted to be used in a simulated reality environment in accordance with a viewer's perspective;
(b) providing a connection from each of the plurality of video surveillance camera systems, via an internet compatible device and via a global computer network, to the video sharing operator/manager;
(c) registering a plurality of sellers on the video sharing operator/manager, the sellers each controlling at least one of the plurality of video surveillance camera systems on the video sharing operator/manager;
(d) registering a plurality of buyers on the video sharing operator/manager, each buyer having access to the video sharing operator manager to request one or more videos from sellers;
(e) recording surveillance video by at least one of the video surveillance camera systems by the sellers and tagging the video with the capture information,
(f) uploading and storing the tagged capture information on a database of the video sharing operator/manager, wherein the database is searchable by the tagged capture information by the buyers;
(g) searching for and requesting video in the database based on a specific set of capture information by the buyer;
(h) uploading video by the seller in response to the requested video from the buyer; and
(i) purchasing and downloading of the uploaded video by the buyer.

8. The method of claim 7, wherein the capture information further comprises at least one of direction, height, resolution, color information, night vision information, and type of camera.

9. The method of claim 7, including the step of the buyer subscribing to a purchase plan for a limited time for a designated price, wherein the buyer purchases a plurality of videos during a particular time period for a flat rate.

10. The method of claim 7, wherein the requested video segment is authenticated by a nonfungible token to provide a public certificate of authenticity.

* * * * *